(12) United States Patent
Wu

(10) Patent No.: US 9,971,051 B2
(45) Date of Patent: May 15, 2018

(54) HIGH-FIDELITY ADAPTIVE CURVELET DOMAIN PRIMARY-MULTIPLE SEPARATION PROCESSING OF SEISMIC DATA

(71) Applicant: CGG SERVICES SA, Massy (FR)

(72) Inventor: Xiang Wu, Singapore (SG)

(73) Assignee: CGG SERVICES SAS, Massy (FR)

( * ) Notice: Subject to any disclaimer, the term of this patent is extended or adjusted under 35 U.S.C. 154(b) by 574 days.

(21) Appl. No.: 14/152,007

(22) Filed: Jan. 10, 2014

(65) Prior Publication Data

US 2014/0200819 A1    Jul. 17, 2014

Related U.S. Application Data

(60) Provisional application No. 61/752,169, filed on Jan. 14, 2013.

(51) Int. Cl.
*G01V 1/36* (2006.01)

(52) U.S. Cl.
CPC ............ *G01V 1/364* (2013.01); *G01V 1/36* (2013.01); *G01V 2210/56* (2013.01)

(58) Field of Classification Search
CPC . G01V 1/364; G01V 1/36; G01V 1/34; G01V 1/345; G01V 1/32; G01V 1/307; G01V 1/28; G01V 1/282; G01V 2210/56
See application file for complete search history.

(56) References Cited

U.S. PATENT DOCUMENTS

| | | | |
|---|---|---|---|
| 5,572,483 A | 11/1996 | Chambers et al. | |
| 6,691,039 B1 | 2/2004 | Wood | |
| 2011/0147004 A1* | 6/2011 | Neelamani | G01V 1/36 166/369 |
| 2011/0276273 A1 | 11/2011 | Artman et al. | |
| 2012/0245851 A1 | 9/2012 | Ji | |

OTHER PUBLICATIONS

Herrmann et al., Curvelet-Domain Multiple Elimination with Sparseness Constraints, Oct. 10-15, 2004, SEG Int'l Exposition and 74th Annual Meeting, Denver, Colorado, 4 pp.*
Felix J. Herrmann, Curvelet-Domain Matched Filtering, 2008, SEG Las Vegas 2008 Annual Meeting, pp. 3643-3649.*
Herrmann et al., Curvelet-Based Seismic Data Processing: A Multiscale and Nonlinear Approach, Aug. 16, 2007, 18 pp.*
Office Action in corresponding Singapore Application No. 2014002927 dated Feb. 10, 2015.

(Continued)

*Primary Examiner* — Toan Le
(74) *Attorney, Agent, or Firm* — Patent Portfolio Builders PLLC

(57) ABSTRACT

Methods and systems for separating multiple events from primary events in noisy seismic data are described. Multiples are predicted and then the predictions are improved by least-square matching filtering in the space and time domain. An adaptive curvelet domain separation (ACDS) is then performed and the ACDS equation is solved with an iterative soft-thresholding technique. Further processing can be added to compensate for prediction inaccuracy or variable/ excessive seismic data noise by dividing the seismic data into predetermined bands and processing each band independently.

19 Claims, 15 Drawing Sheets

(56) References Cited

OTHER PUBLICATIONS

Hong-Yan Shen, et al.; "A new method of seismic wavefield separation and denoising"; 2nd International Conference on Advanced Computer Control (ICACC); Mar. 27-29, 2010; pp. 107-100.

F.J. Billette et al., "The 2004 BP Velocity Benchmark", EAGE 67th Conference & Exhibition, Madrid, Spain, Jun. 13-16, 2005, pp. 1-4, European Association of Geoscientists and Engineers, Expanded Abstracts, B035.

E. Candes et al., "Fast Discrete Curvelet Transforms", SIAM Multiscale Model Simul., Jul. 2005, revised Mar. 2006, 5, pp. 861-899.

I. Daubechies et al., "An Iterative Thresholding Algorithm for Linear Inverse Problems with a Sparsity Constraint", Comm. Pure Appl. Math., Feb. 1, 2008, 57, 1413-1457.

N. Hargreaves, "Surface Multiple Attenuation in Shallow Water and the Construction of Primaries from Multiples", 76th Annual International Meeting, SEG, Oct. 1-6, 2006, Expanded Abstracts, pp. 2689-2693.

F.J. Herrmann et al., "Adaptive Curvelet-Domain Primary-Multiple Separation", Geophysics, May-Jun. 2008, vol. 73, No. 3, pp. A17-A21.

B. Hung et al., "Shallow Water Demultiple", ASEG Meeting, 2010, Sydney, Australia, pp. 1-4.

R. Neelamani et al., "Adaptive Substraction Using Complex-Valued Curvelet Transforms", Geophysics, Jul.-Aug. 2010, vol. 75, No. 4, pp. V51-V60.

R. Saab et al., "Curvelet-Based Primary-Multiple Separation from a Bayesian Perspective", 77th Annual International Meeting, SEG, San Antonio, Texas, Sep. 23-28, 2007.

D.J. Verschuur et al., "Estimation of Multiple Scattering by Iterative Inversion, Part II: Practical Aspects and Examples", Geophysics, Sep.-Oct. 1997, vol. 62, No. 5, pp. 1596-1611.

M. Wang et al., "Application of Inverse Scattering Series Method for Internal Multiple Attenuation—A Case Study", 22nd International Geophysical Conference and Exhibition, Feb. 26-29, 2012, Brisbane, Australia, ASEG Extended Abstract, vol. 1, pp. 1-4.

P. Wang et al., "Model-Based Water-Layer Demultiple", 81st Annual International Meeting, SEG, San Antonio, Texas, Sep. 18-23, 2011, pp. 3551-3555.

Y. Zhang et al., "Predicting Multiples Using a Reverse Time Demigration", 82nd Annual International Meeting, SEG, Las Vegas, Nevada, Nov. 4-9, 2012, pp. 1-5.

Daniela Donno, "Improving multiple removal using least-squares dip filters and independent component analysis", Geophysics, Sep. 1, 2011, pp. V91-V104, vol. 76, No. 5.

Deli Wang et al., "Bayesian wavefield separation by transform-domain sparsity promotion", Geophysics, Sep. 1, 2008, pp. A33-A38, vol. 73, No. 5.

Extended European Search Report, dated Nov. 22, 2017, from corresponding EP Application No. 14150941.4.

* cited by examiner

HIGH-FIDELITY ADAPTIVE CURVELET DOMAIN PRIMARY-MULTIPLE SEPARATION PROCESSING OF SEISMIC DATA

RELATED APPLICATION

The present application is related to, and claims priority from U.S. Provisional Patent Application No. 61/752,169, filed Jan. 14, 2013, entitled "HIGH-FIDELITY ADAPTIVE CURVELET DOMAIN PRIMARY-MULTIPLE SEPARATION," to Xiang W U, the disclosure of which is incorporated herein by reference.

TECHNICAL FIELD

Embodiments of the subject matter disclosed herein generally relate to methods and systems for seismic data processing and, more particularly, to mechanisms and techniques for separating multiples from primary events in seismic data.

BACKGROUND

Seismic data acquisition and processing techniques are used to generate a profile (image) of a geophysical structure (subsurface) of the strata underlying the land surface or seafloor. Among other things, seismic data acquisition involves the generation of acoustic waves and the collection of reflected/refracted versions of those acoustic waves to generate the image. This image does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process in the field of seismic surveying.

The signals recorded by seismic receivers vary in time, having energy peaks that may correspond to reflectors between layers in the subsurface being imaged. In reality, and referencing marine seismic acquisition as an example, since the sea floor and the air/water are highly reflective, some of the peaks correspond to multiple reflections or spurious reflections that should be eliminated before the geophysical structure can be correctly imaged. So-called primary waves suffer only one reflection of the acoustic wave generated by a source to the receiver, i.e., a reflection from an interface between layers of the subsurface. Waves other than primary waves are known as multiples. A surface multiple signal, i.e., a signal generated when an acoustic wave strikes the water's surface, is one example of a multiple, however there are other ways for multiples to be generated. Surface multiples can travel back down to the receivers and be recorded as ghosts. Multiples hinder the interpretation of the geology beneath the ocean floor, and thus they are, in essence, noise for most seismic data processing purposes. It is therefore typically desirable to eliminate them and/or substantially reduce and/or eliminate their influence in signal processing of the other reflected signals so as to correctly ascertain the presence (or the absence) of underground/underwater hydrocarbon deposits.

Accordingly, it will be appreciated by those skilled in the art that, in order to improve seismic images, multiples attenuation plays an important role in the pre-processing of seismic data. Generally, the process of multiples attenuation involves two steps: 1) the prediction of multiples; and 2) the separation of the primaries and multiples. Over the past two decades, considerable effort has been dedicated to improving the capability to predict multiples.

For example, methods such as Surface Related Multiple Elimination (SRME) have become routine tools for effective multiple prediction of long-period multiples. In conjunction, short-period multiples generated by a shallow sea floor and internal multiples generated by subsurface interfaces of high impedance contrast have also attracted the attention of the research community, e.g., research by N. Hargreaves in his 2006 article entitled "Surface Multiple Attenuation in Shallow Water and the Construction of Primaries from Multiples," published in 76th Annual International Meeting, SEG, Expanded Abstracts, pages 2689-2693 and incorporated herein by reference, by P. Wang, H. Jin, S. Xu and Y. Zhang in their 2011 article entitled "Model-Based Water-Layer Demultiple," published in 81st Annual International Meeting, SEG and incorporated herein by reference and by M. Wang, B. Hung and K. Xin in their 2012 article entitled "Application of Inverse Scattering Series Method for Internal Multiple Attenuation: A Case Study," published in ASEG Extended Abstract and incorporated herein by reference.

Equally as important as advancements in multiples prediction, is the development of an effective strategy for separating multiples from primaries. One of the most widely accepted strategies for multiple/primary separation is the L2-Norm based least-square separation method (LS) as described by D. J. Verschuur and A. J. Berkhout in their 1997 article entitled "Estimation of Multiple Scattering by Iterative Inversion, Part II: Practical Aspects and Examples," published in Geophysics, 62, pages 1596-1611 and incorporated herein by reference. The LS method allows for a degree of inaccuracy in the prediction of the multiples, i.e., comprising errors in the travel time, the amplitude and the spectrum. However, a compromise is required between the preservation of the primaries and the attenuation of the multiples, especially in locations where primary and multiple events either cross each other or overlap.

As a result of the compromise between preservation of primaries and attenuation of multiples increasing attention has been devoted to other separation methods such as curvelet-based separation methods. Curvelet-based separation methods have the advantage of minimizing the damage to the primary events based on the compatible nature of the curvelet transform to seismic data, as described by F. J. Herrmann, D. Wang and D. J. Verschuur in their 2008 article entitled "Adaptive Curvelet-Domain Primary-Multiple Separation," published in Geophysics, 73, pages 17-21 and incorporated herein by reference.

Unfortunately, symptomatic of the various implementations of the curvelet domain separation approaches, the non-adaptive implementations can encounter a problem of numerical divergence if the predicted multiples vary from the actual multiples in the seismic data and the adaptive implementations either only correct for limited misalignment between the predicted multiples and the actual multiples or incur high computational costs based on the use of curvelet matching filtering as described by R. Saab, D. Wang, Ö. Yılmaz and F. J. Herrmann in their 2007 article entitled "Curvelet-Based Primary-Multiple Separation from a Bayesian Perspective," published in The 77th Annual International Meeting, SEG and incorporated herein by reference and by R. Neelamani, A. Baumstein, and W. S. Ross in their 2010 article entitled "Adaptive Subtraction Using Complex-Valued Curvelet Transforms," published in Geophysics, 75, pages 51-60 and incorporated herein by reference.

Accordingly, it would be desirable to provide systems and methods that avoid the afore-described problems and drawbacks associated with the improvement of seismic images based on multiple prediction and multiple/primary separation by converging curvelet approaches.

SUMMARY

Embodiments address the foregoing problems and drawbacks by providing methods and systems for separating multiple events from primary events in noisy seismic data. Multiples are predicted and then the predictions are improved by least-square matching filtering in the space and time domain. An adaptive curvelet domain separation (ACDS) is then performed and the ACDS equation is solved with an iterative soft-thresholding technique. Further processing can be added to compensate for prediction inaccuracy or excessive seismic data noise by dividing the seismic data into predetermined bands and processing each band independently.

According to an embodiment, a method for separating multiple events from primary events in noisy seismic data includes the steps of adjusting predicted multiples to substantially match the multiple events using a least-square matching filter in a space and time domain, solving an adaptive curvelet domain separation (ACDS) equation based on the noisy seismic data and the adjusted predicted multiples; and outputting separated the multiple events and the primary events.

According to another embodiment, a system for separating multiple events from primary events in noisy seismic data includes a memory device configured to store the noisy seismic data; one or more processors configured to execute computer instructions and wherein the memory device is further configured to store the computer instructions wherein the computer instructions further comprise: a multiples predicting component for generating predicted multiples associated with said noisy seismic data; a tuning component for adjusting the predicted multiples to substantially match the multiple events associated with the noisy seismic data using a least-square matching filter in a space and time domain; an adaptive curvelet domain separation (ACDS) component for solving an ACDS equation based on the noisy seismic data and a plurality of adjusted predicted multiples; and an output component for separately outputting the multiple events and the primary events.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of high-fidelity adaptive curvelet domain primary-multiple separation. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments described herein, methods and systems for primary-multiple separation are presented which, for example, provide for separating multiples from primary events in seismic data and subsequently removing the embedded multiples from noisy seismic data using the curvelet transform by performing a least-square filtering in the space and time domain. Such methods and systems can, for example, be used to better preserve low frequency components of the primary and to attenuate noise and less credibly modeled multiples in high frequency bands.

Figure 1A:
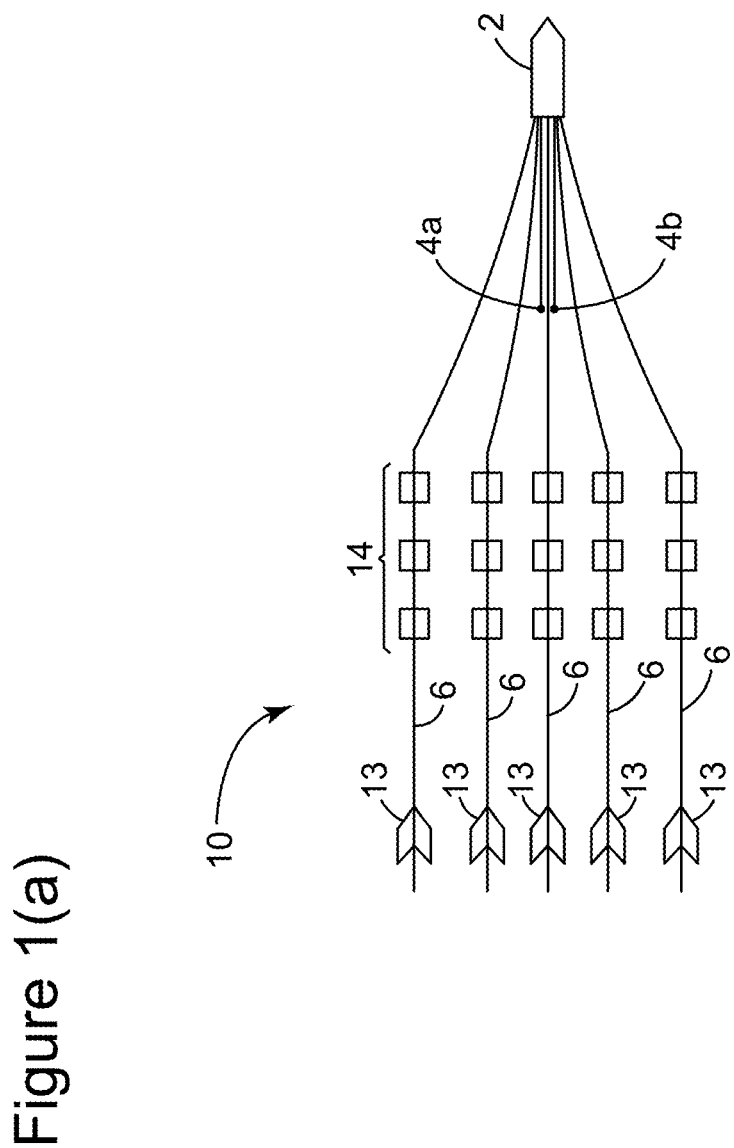
FIGS. 1(a)-(b) and 2(a)-(b) depict various aspects of an exemplary marine seismic survey system in which various shear noise suppression embodiments can be implemented.
Figure 1B:
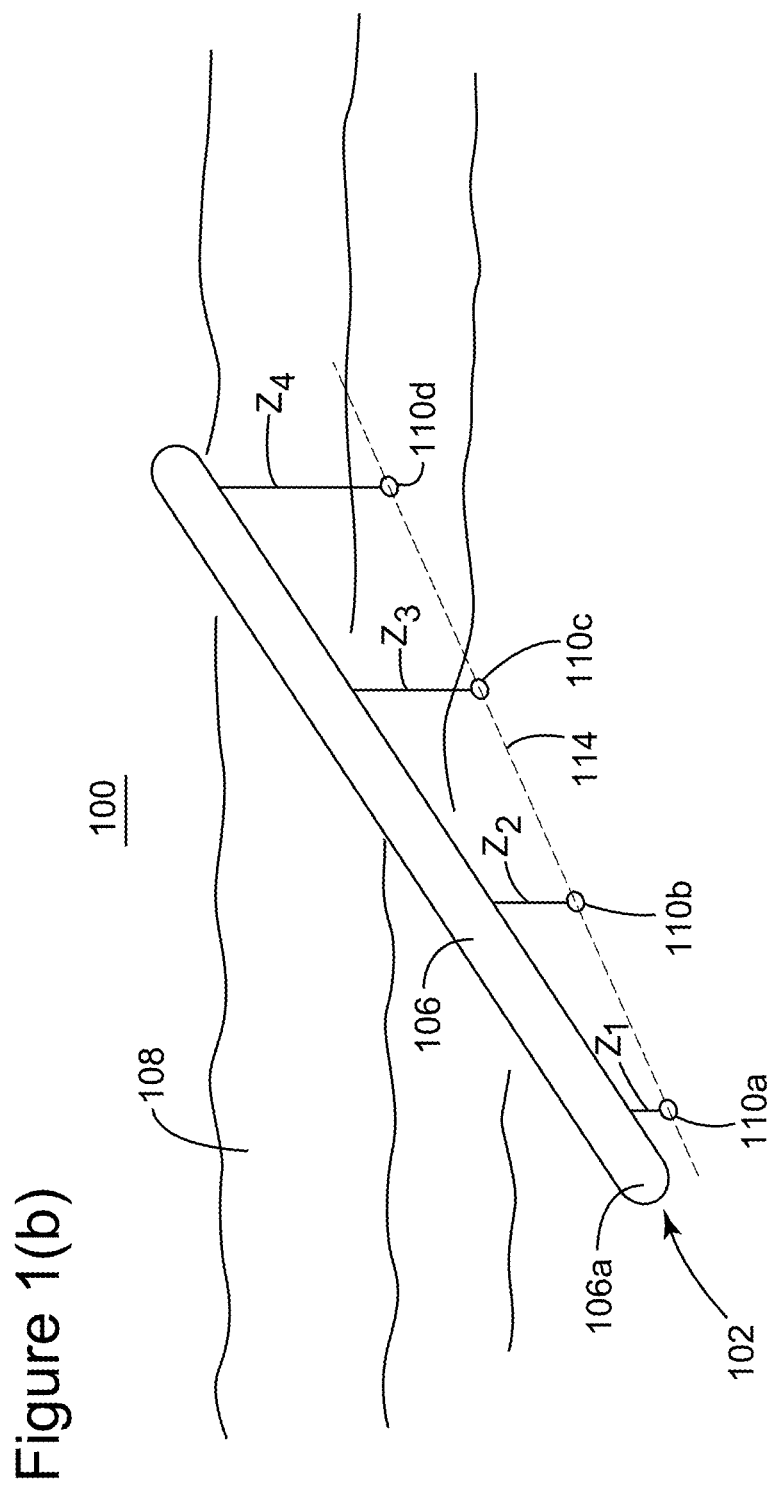

In order to provide some context for the subsequent exemplary embodiments related to high-fidelity adaptive curvelet domain primary-multiple separation, consider first a seismic data acquisition process and system as will now be described with respect to FIGS. 1(a), 1(b), 2(a) and 2(b). In FIG. 1(a), a data acquisition system 10 includes a ship 2 towing a plurality of streamers 6 that can extend one or more kilometers behind the ship 2. Each of the streamers 6 can include one or more birds 13 that maintain the streamer 6 in a known fixed position relative to other streamers 6, and the one or more birds 13 are capable of moving the streamers 6 as desired according to bi-directional communications received by the birds 13 from the ship 2.

One or more source arrays 4a,b can also be towed by ship 2, or another ship, for generating seismic waves. Source arrays 4a,b can be placed either in front of or behind the receivers 14, or both behind and in front of the receivers 14. The seismic waves generated by the source arrays 4a,b propagate downward, reflect off of, and penetrate the seafloor, wherein the refracted waves eventually are reflected by one or more reflecting structures (not shown in FIG. 1(a)) back to the surface (see FIG. 2(a), discussed below). The reflected seismic waves then propagate upward and are detected by the receivers 14 disposed on the streamers 6. The seismic waves then reflect off of the free surface, i.e., the surface of the body of water (see FIG. 2(a), discussed below), traveling downward and are once again detected by the receivers 14 disposed on streamers 6 as receiver ghosts. This process is generally referred to as "shooting" a particular seafloor area, with the seafloor area referred to as a "cell" and the sea surface referred to as a "free surface."

Further, the embodiments can be used with a multi-level source. A multi-level source 100 has one or more sub-arrays. The first sub-array 102 has a float 106 that is configured to float at the water surface 108 or underwater at a predetermined depth. Plural source points 110a-d are suspended from the float 106 in a known manner. A first source point 110a may be suspended closest to the head 106a of the float 106, at a first depth z1. A second source point 110b may be suspended next, at a second depth z2, different from z1. A third source point 110c may be suspended next, at a third depth z3, different from z1 and z2, and so on. FIG. 1A shows, for simplicity, only four source points 110a-d, but an actual implementation may have any desired number of source points.

In one application, because the source points are distributed at different depths, the source points at the different depths are not simultaneously activated. In other words, the source array is synchronized, i.e., a deeper source point is activated later in time (e.g., 2 ms for 3 m depth difference when the speed of sound in water is 1500 m/s) such that corresponding sound signals produced by the plural source points coalesce, and thus, the overall sound signal produced by the source array appears as being a single sound signal.

The depths z1 to z4 of the source points of the first sub-array 102 may obey various relationships. In one application, the depths of the source points increase from the head toward the tail of the float, i.e., z1<z2<z3<z4. In another application, the depths of the source points decrease from the head to the tail of the float. In another application, the source points are slanted, i.e., the source points are provided on an imaginary line 114. In still another application, the line 114 is a straight line. In yet another application, the line 114 is a curved line, e.g., part of a parabola, circle, hyperbola, etc. In one application, the depth of the first source point for the sub-array 502 is about 5 m and the largest depth of the last source point is about 8 m.

In a variation of this embodiment, the depth range is between 8.5 and 10.5 m or between 11 and 14 m. In another variation of this embodiment, when the line 514 is straight, the depths of the source points increase by 0.5 m from a source point to an adjacent source point. Those skilled in the art would recognize that these ranges are exemplary and these numbers may vary from survey to survey. A common feature of all these embodiments is that the source points have variable depths so that a single sub-array exhibits multiple-level source points.

Figure 2A:
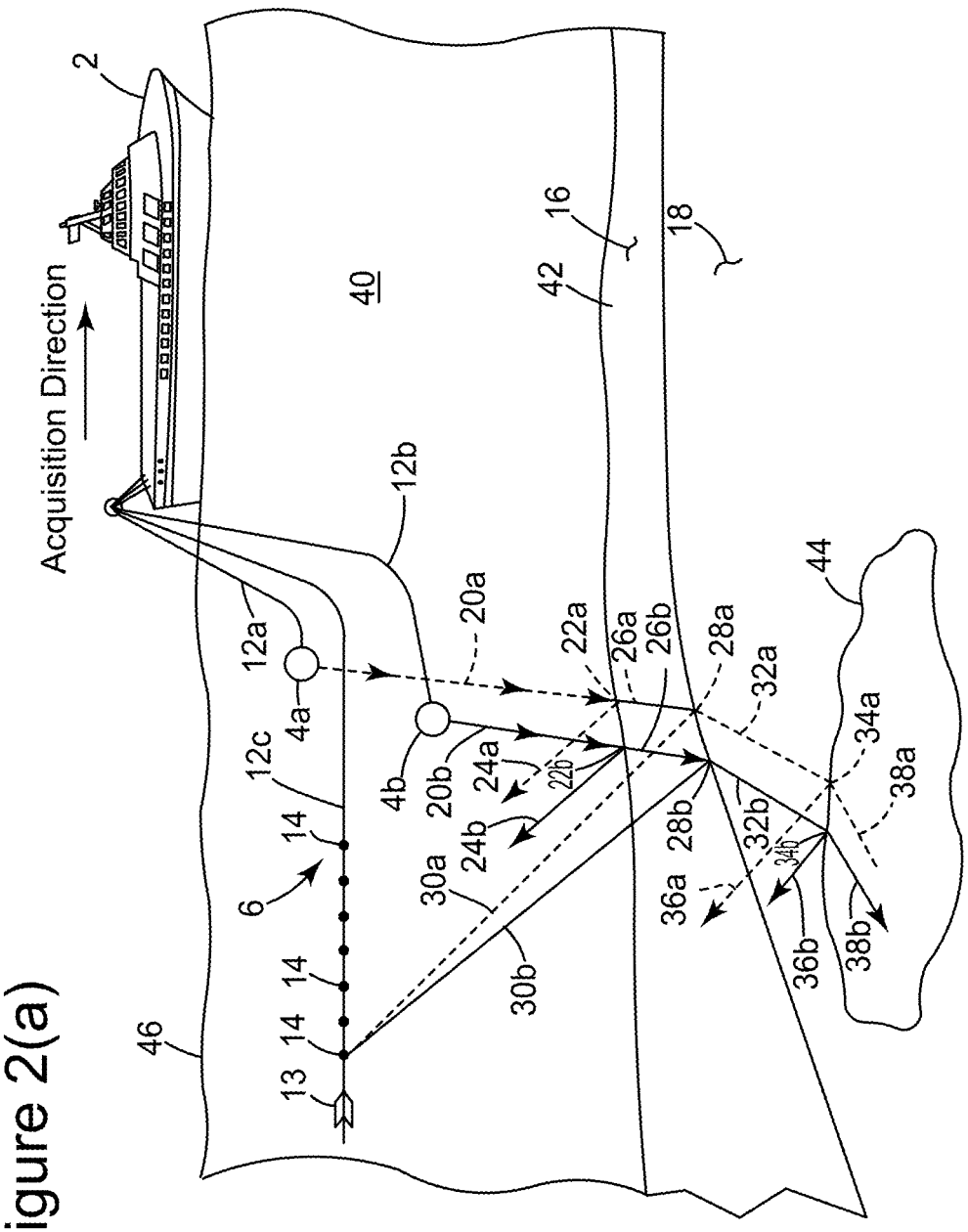

FIG. 2(a) illustrates a side view of the data acquisition system 10 of FIG. 1(a). Ship 2, located on sea surface 46, tows one or more streamers 6, wherein the streamer 6 are comprised of cables 12a,b,c and a plurality of receivers 14. Shown in FIG. 2(a) are two source streamers, which include sources 4a,b attached to respective cables 12a,b. Each source 4a,b is capable of transmitting a respective sound wave, or transmitted signal 20a,b. For the sake of simplifying the drawings, but while not detracting at all from an understanding of the many principles involved, only a first pair of transmitted signals 20a,b will be shown (even though some or all of sources 4 can be simultaneously (or not) transmitting similar transmitted signals 20). First transmitted signal 20a,b travels through the sea 40 and arrives at first refraction/reflection point 22a,b. First reflected signal 24a,b from first transmitted signal 20a,b travels upward from the seafloor 42, and back to the receivers 14. As those of skill in the art can appreciate, whenever a signal—optical or acoustical—travels from one medium with a first index of refraction $n_1$ and meets with a different medium, with a second index of refraction $n_2$, a portion of the transmitted signal is reflected at an angle equal to the incident angle (according to the well-known Snell's law), and a second portion of the transmitted signal can be refracted (again according to Snell's law).

Accordingly, as shown in FIG. 2(a), first transmitted signal 20a,b generates first reflected signal 24a,b and first refracted signal 26a,b. First refracted signal 26a,b travels through sediment layer 16 (which can be generically referred to as first subsurface layer 16) beneath ocean floor 42, and can now be considered to be a "new" transmitted signal, such that when it encounters a second medium at second refraction/reflection point 28a,b, a second set of refracted and reflected signals 32a,b and 30a,b are subsequently generated. Further, as shown in FIG. 2(a), there happens to be a significant hydrocarbon deposit 44 within a third medium, or solid earth/rock layer 18 (which can be generically referred to as second subsurface layer 18). Accordingly, refracted 38a,b and reflected 36a,b signals are generated by the hydrocarbon deposit at the refraction/reflection point 34a,b and it is the purpose of data acquisition system 10 to generate data that can be used to discover such hydrocarbon deposits 44.

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples. A surface multiple signal (not shown) is one such example of a multiple, however there are other ways for multiples to be generated. For example, reflections form the surface can travel back down to the receivers and be recorded as ghosts. Multiples do not add any useful information about the geology beneath the ocean floor, and thus they are, in essence, noise, and it is desirable to eliminate them and/or substantially reduce and/or eliminate their influence in signal processing of the other reflected signals so as to correctly ascertain the presence (or the absence) of underground/underwater hydrocarbon deposits. Similarly ghosts, i.e., reflections of primary waves or multiples from the surface of the water which are again recorded by receivers 14, should also be suppressed or removed.

The embodiments are discussed without specifying what type of seismic receivers is used to record the seismic data. In this sense, it is known in the art to use, for a marine seismic survey, streamers that are towed one or more vessels and the streamers include the seismic receivers. The streamers may be horizontal or slanted or have a curved profile as illustrated in FIG. 2(b).

Figure 2B:
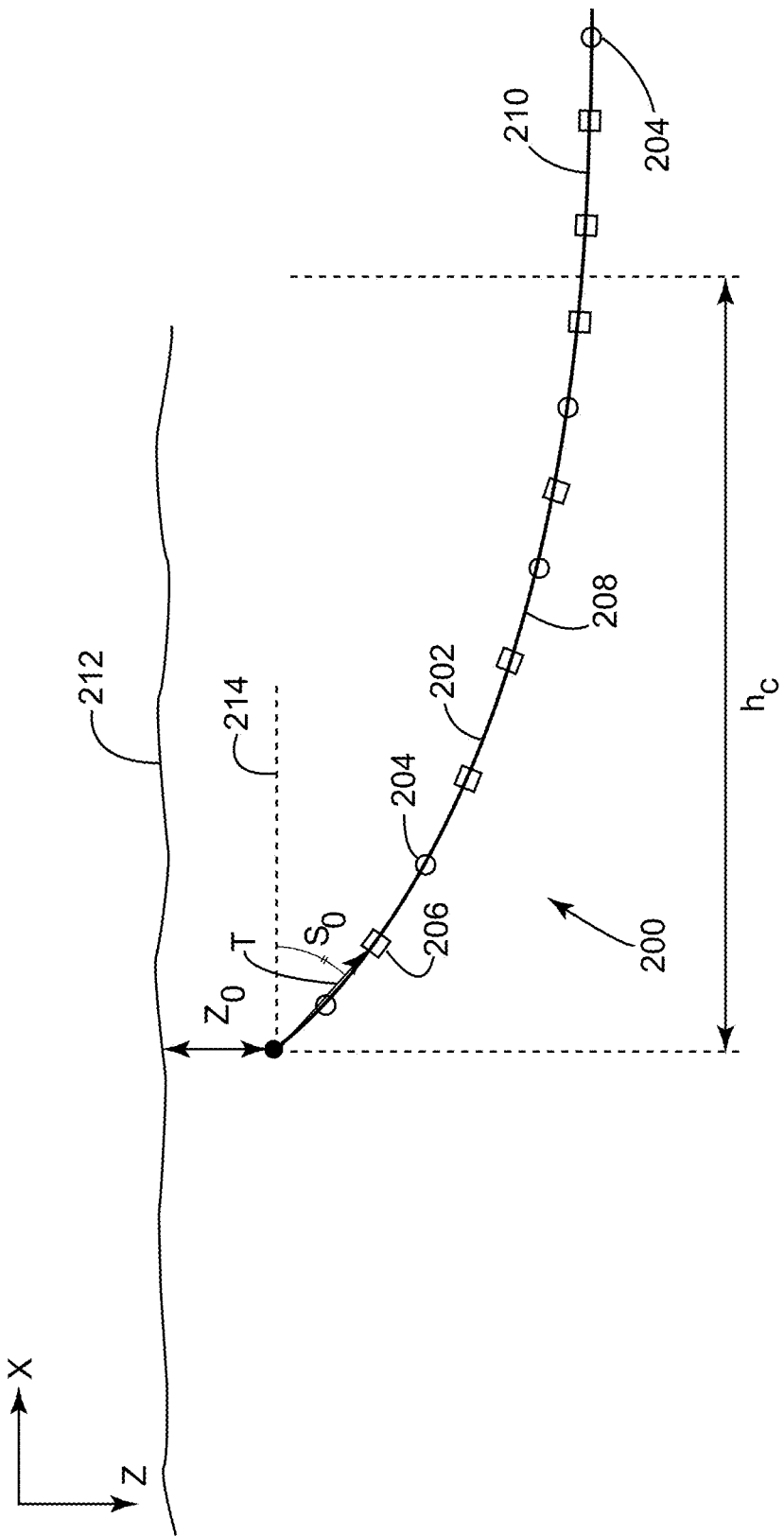

The curved streamer 200 of FIG. 2(b) includes a body 202 having a predetermined length; plural detectors 204 provided along the body; and plural birds 206 provided along the body for maintaining the selected curved profile. The streamer is configured to flow underwater when towed such that the plural detectors are distributed along the curved profile. The curved profile may be described by a parameterized curve, e.g., a curve described by (i) a depth z0 of a first detector (measured from the water surface 212), (ii) a slope s0 of a first portion T of the body with an axis 214 parallel with the water surface 212, and (iii) a predetermined horizontal distance hc between the first detector and an end of the curved profile. It is noted that not the entire streamer has to have the curved profile. In other words, the curved profile should not be construed to always apply to the entire length of the streamer. While this situation is possible, the curved profile may be applied only to a portion 208 of the streamer. In other words, the streamer may have (i) only a portion 208 having the curved profile or (ii) a portion 208 having the curved profile and a portion 210 having a flat profile, the two portions being attached to each other.

The data collected and recorded by receivers 14 of FIG. 2(a) can be processed to, among other things, separate multiples from primary events in seismic data and subsequently removing the embedded multiples from noisy seismic data using a curvelet transform. In an embodiment, the optimization problem is formularized by incorporating L1-norms and L2-norms, based on the framework of Bayesian Probability Maximization (BPM). The embodiment incorporates iterative soft-thresholding for solving the optimization problem and with filtering by least-square matching; the multiple models are preconditioned to match the actual multiples in the seismic data prior to the separation step.

To provide a context for the one or more embodiment descriptions and an understanding of how a curvelet domain separation is accomplished, a description of a curvelet domain separation implementation presents the curvelet transform and a process for simultaneously separating the multiples and the primaries from each other. The curvelet transform is a multi-scale and multi-dimensional transform and can be expressed as follows:

$$C(j,\vec{k},l)=\int_{R^2} D(t,x)\varphi_{j,\vec{k},l}(t,x)dtdx \qquad (1)$$

where $C(j,\vec{k},l)$ is the curvelet coefficient indexed by its frequency band j, dip l and time-space displacement $\vec{k}$, $D(t,x)$ is the two-dimensional (2D) seismic sample at time t and position x and $\varphi_{j,\vec{k},l}(t,x)$ is the curvelet basis. It should be noted in an embodiment that the term multi-scale is based on the fact that both k and/increase in dyadic order for every other j.

Figure 3:
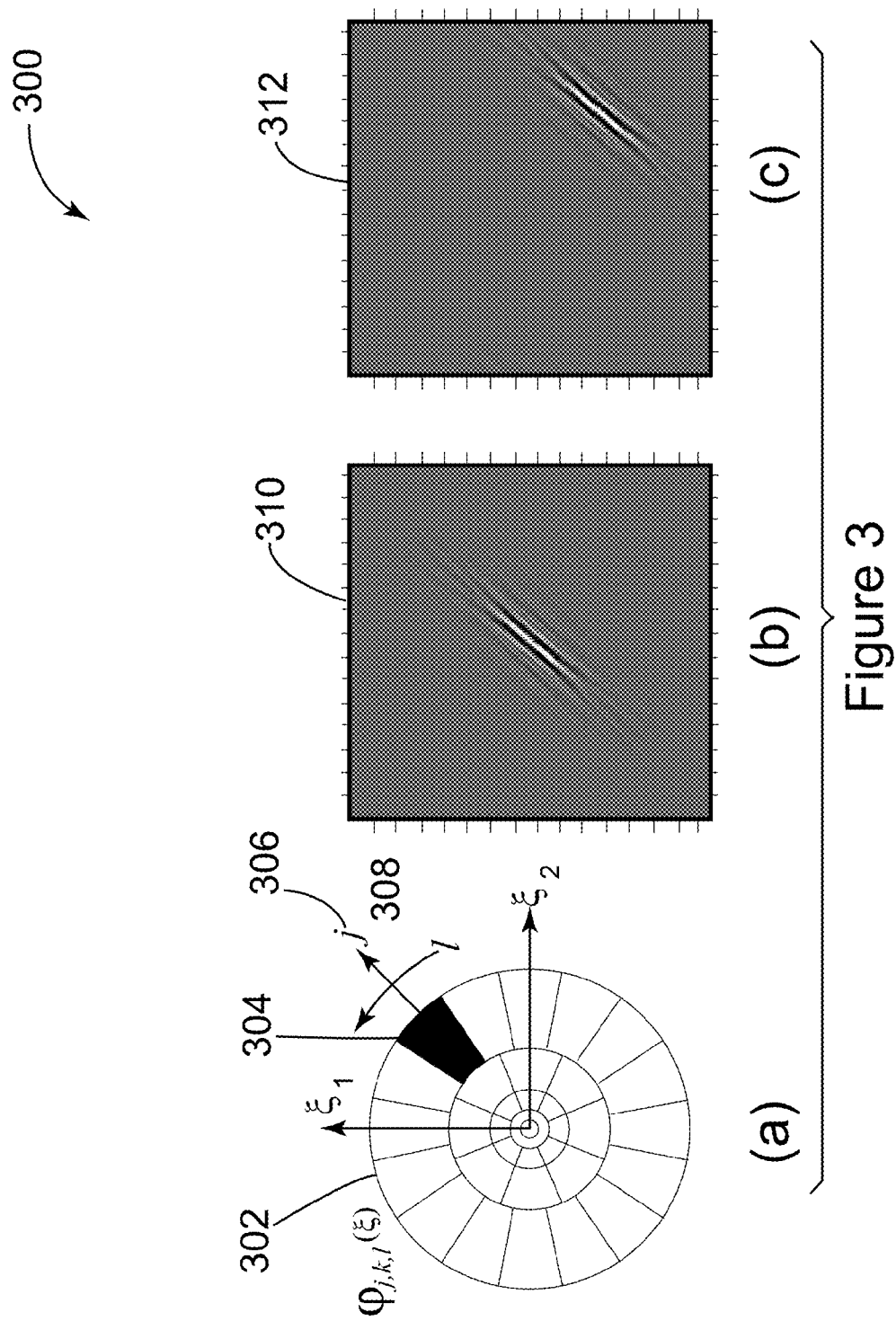
FIG. 3 depict various aspects of a curvelet tiling domain.

Looking now to FIG. 3 and an embodiment, a curvelet is localized in both the frequency and the time-space domain in contrast to localization in either a time-space or a frequency domain, i.e., FIG. 3(a) presents the curvelet tiling 302 in the frequency domain wherein $\varphi_{j,\vec{k},l}(\xi)$ is the Fourier transform of curvelet basis $\varphi_{j,\vec{k},l}(t,x)$ as shown 304 for a given j 306 and l 308, FIG. 3(b) is the curvelet depicted in FIG. 3(a) presented in a time-space domain with zero displacement 310 and FIG. 3(c) is the curvelet depicted in FIG. 3(a) presented in a time-space domain with a non-zero displacement 312. It should be noted in the embodiment that in seismic data, most seismic events are either linear or curved in shape within a small spatiotemporal window, i.e, the needle-like curvelets form a suitable and natural basis for representing the data, leading to the sparseness of the curvelet coefficients of the data. Further in the embodiment and based on the sparseness, there exists a way to separate multiples from primaries by using the modified BPM technique previously described. Considering the curvelet domain of an embodiment, the L1-norm is introduced in the optimization problem because the sparse coefficients follow a steeper distribution than Gaussian. Accordingly, an iterative soft-thresholding technique is used to solve the optimization problem.

Continuing with the embodiment, it should be noted that the convergence of the iterative solver relies on an initial estimation of the predicted multiples that is sufficiently close to the actual multiples in the data. Therefore, a least-squares matching filtering will be utilized to bring the amplitude, travel time and spectrum of the predicted model closer to those of the actual multiples in the data prior to applying the iterative soft-thresholding optimization.

Next in the embodiment, a designed matching filter ($f_{LS}$) is applied to the predicted model equation term (M') producing the Adaptive Curvelet Domain Separation (ACDS) equation as follows:

$$f(P_c,M_c)=||P_c||_{1,w_1}+||M_c||_{1,w_2}+||C^{-1}M_c-f_{LS}*M'||_2^2+\eta||C^{-1}(P_c+M_c)-D||_2^2 \qquad (2)$$

where $P_c$ and $M_c$ are the primaries and multiples, respectively, in the curvelet domain, D and M' are the data and the predicted multiple model, respectively, in the time-space domain, C denotes the forward curvelet transform, $C^{-1}$ denotes the inverse curvelet transform, $w_1$ and $w_2$ are proportional to the curvelet coefficients of the initial guess of the model and data, subscripts 1, $w_1$, denote the element-wise weighted L1-norm and the subscripts 2, $w_2$ denote the element-wise weighted L2-norm and $\eta$ is the overall noise control parameter.

Continuing with the embodiment, and based on the fact that existing multiple prediction techniques suffer from the truncation of high-order multiple terms, spectral narrowing and noise contamination, external filtering, which would result in a multi-fold computational cost, is avoided by making use of intrinsic properties of curvelets. It should be noted in the embodiment that uniform estimation of model inaccuracy and noise level in ACDS may require massaging of the field data based on the fact that modeling error, noise and signal can occupy different frequency ranges. Continuing with the embodiment and noting that the curvelet transform naturally partitions data into different frequency bands, it is possible to manipulate the curvelets in each frequency band independently. Accordingly in the embodiment, a Frequency-regularized ACDS (FrACDS) effectively separates primaries and multiples in the presence of model inaccuracy and noise contamination for each frequency band. It should be noted in the embodiment that the objective function of the optimization problem, Equation (2), is recast as the equation:

$$F(P_c,M_c)=\Sigma_j f_j(P_c,M_c) \qquad (3)$$

where $f_j$ ($P_c$, $M_c$) holds the same expression as Equation (2) but only with respect to scale j of all variables.

Figure 4:
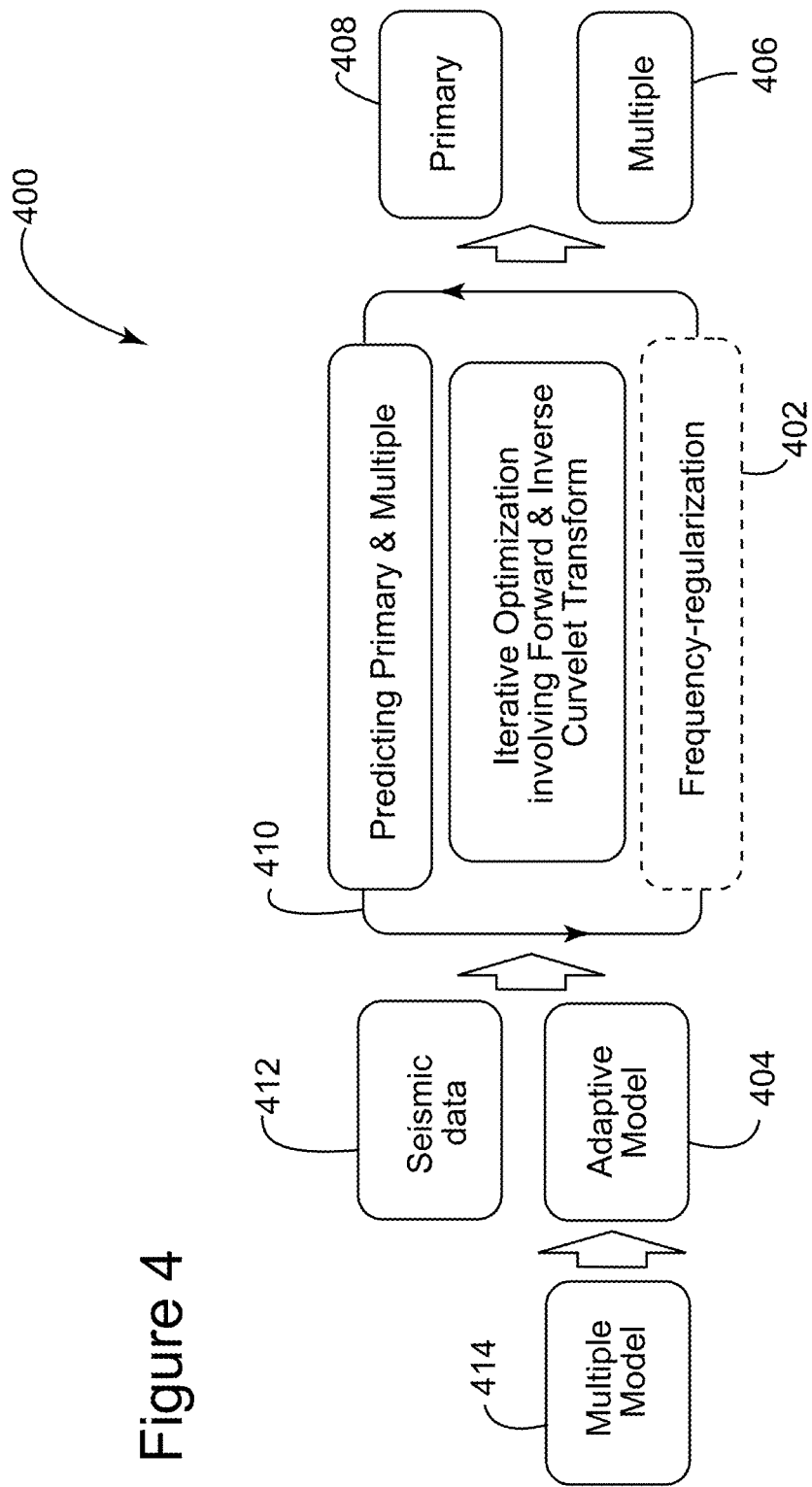
FIG. 4 depicts a flowchart of an ACDS and a Frequency regularized ACDS (FrACDS) separation.

Looking now to FIG. 4, a flowchart of a Frequency-regularized Adaptive Curvelet Domain Separation (FrACDS) 400 is depicted. The embodiment includes the iterative step 410 of Frequency-regularization added to an ACDS model 404, derived from a multiple model 414, to separate multiples 406 from primaries 408 in the seismic data 412. It should be noted in the embodiment that the frequency regularized adaptive curvelet domain separation has greater flexibility of separating different frequency bands in responding to the noise and model inaccuracy control, i.e., the FrACDS provides the opportunity to better preserve low frequency components of the primary and to attenuate noise and the less credibly modeled multiples in high frequency bands. Accordingly, the high adaptability of FrACDS provides higher separation fidelity than previous curvelet domain separation techniques as illustrated by the subsequently described synthetic and field data examples.

Figure 5:
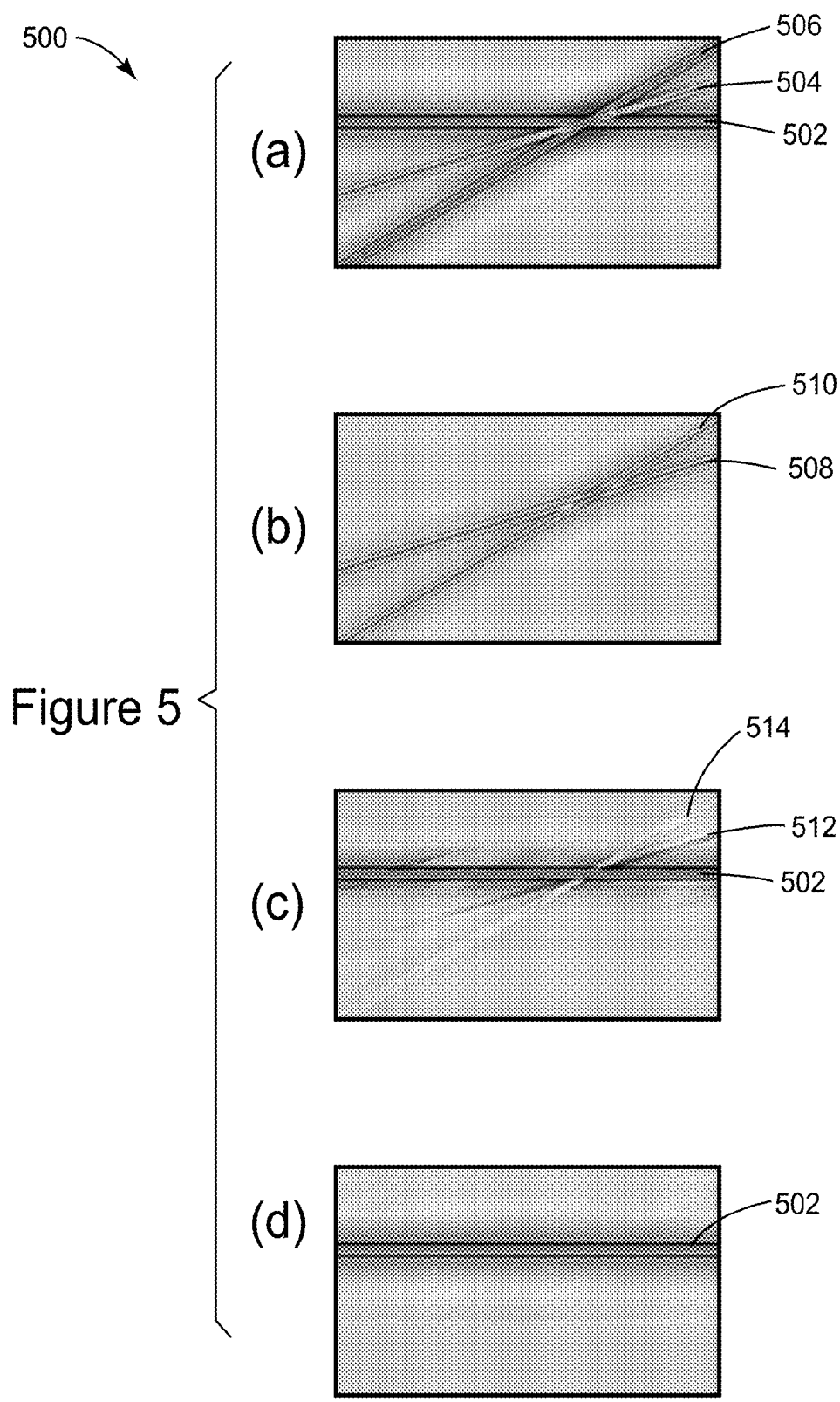
FIGS. 5-6 depict various aspects of synthetic seismic data associated with an embodiment.

Looking now to FIG. 5, depicted are four simple numerical models 500 of synthetic data comprising multiple contaminated data 5(a), multiples generated based on a multiple model 5(b), multiples removed based on a least-squares (LS)

model 5(c) and multiples removed based on an embodiment LS matching filtering ACDS model 5(d). The synthetic data depicted in FIG. 5(a) comprises multiple events 504, 506 crossing a horizontal primary 502. It should be noted in the embodiment that a multiples model, depicted in FIG. 5(b), displays the multiples 508, 510 generated to remove the multiples in the synthetic data. In another aspect of the synthetic data example, FIG. 5(c) depicts the compromised results around the primary 502 based on the residual multiples 512, 514 after a least-squares technique is applied to the synthetic data. Further, FIG. 5(d) depicts the improved results associated with the LS matching filtering ACDS based on the primary and multiple events at the crossing points.

Figure 6:
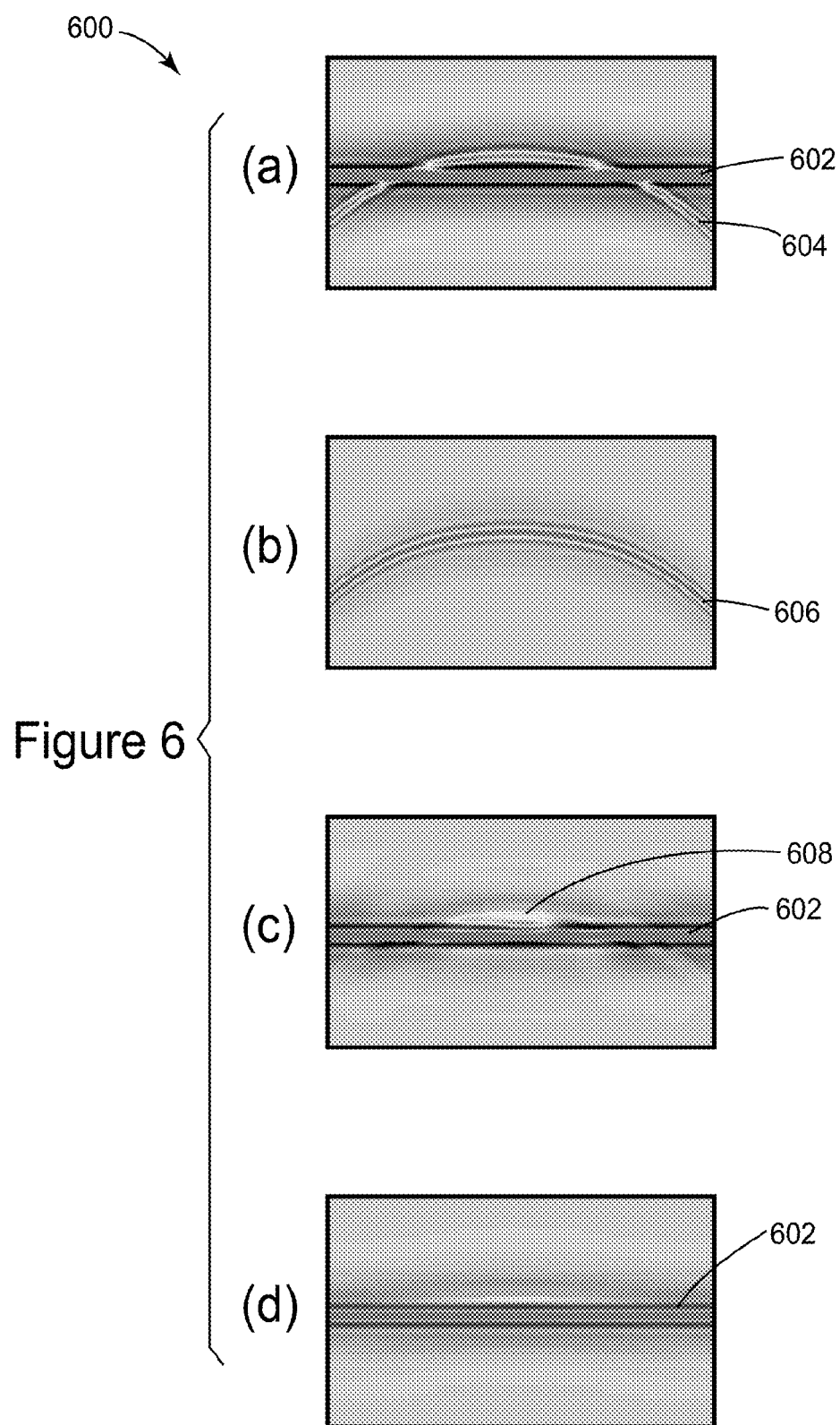

Looking to FIG. 6, similarly depicted is another numerical example set of synthetic data comprising multiple contaminated data 6(a), multiples generated based on a multiple model 6(b), multiples removed based on a least-squares (LS) model 6(c) and multiples removed based on an embodiment LS matching filtering ACDS model 6(d). The synthetic data depicted in FIG. 6(a) comprises a dual crossing multiple event 604 crossing a horizontal primary 602. It should be noted in the embodiment that a multiples model, depicted in FIG. 6(b), displays the multiples 606 generated to remove the multiple 604 in the synthetic data. In another aspect of the synthetic data example, FIG. 6(c) depicts the compromised results around the primary 602 based on the residual multiple 608 after a least-squares technique is applied to the synthetic data. Further, FIG. 6(d) depicts the improved results associated with the LS matching filtering ACDS based on the primary and multiple events at the crossing points. It should be noted in both synthetic examples, FIG. 5(d) and FIG. 6(d), the multiple events are almost completely removed with minimal damage to the primary by the LS matching filtering ACDS based on the fact that the primary events and the multiple events at the crossing are represented by different curvelet coefficients.

Figure 7:
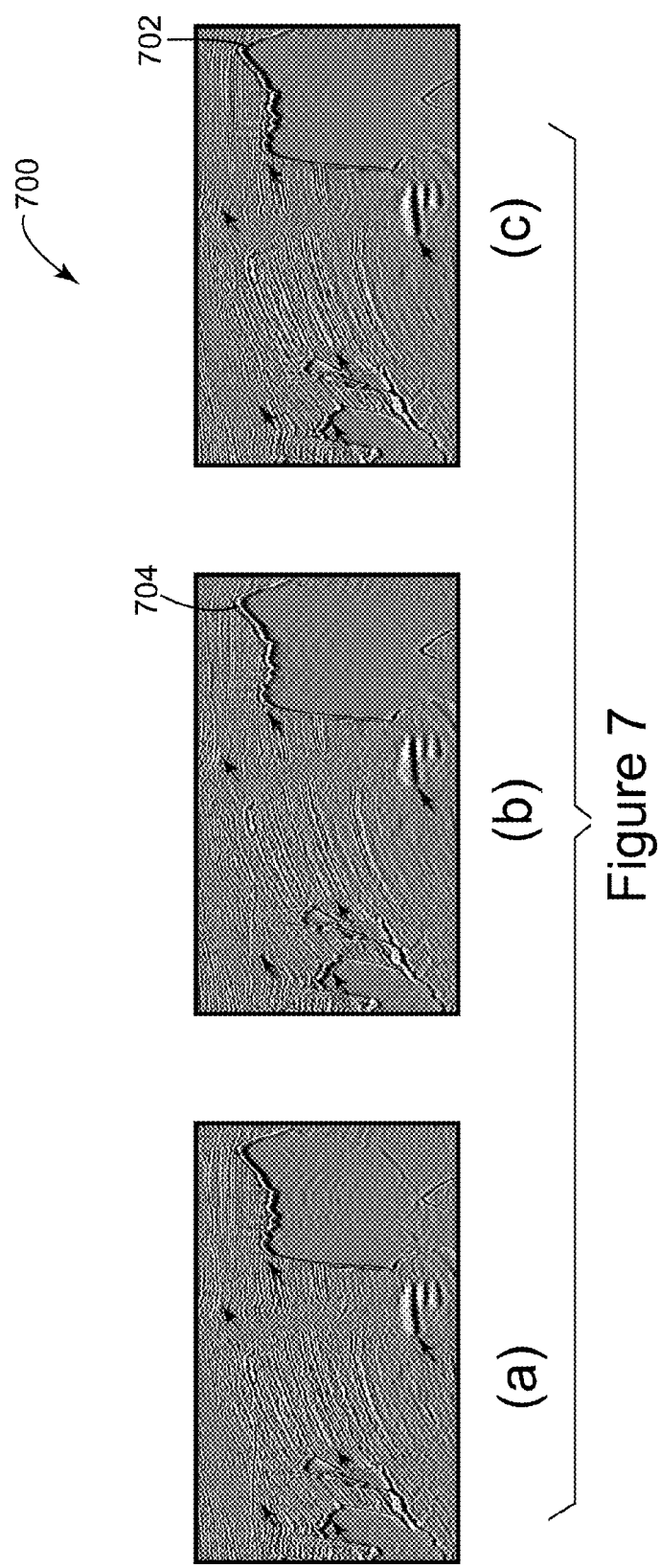
FIGS. 7-8 depict various aspects of field seismic data associated with an embodiment.

Looking to FIG. 7, an example of two-dimensional (2D) field data 700 is depicted with FIG. 7(a) showing multiples contaminated seismic data, FIG. 7(b) showing reverse time demigration predicted multiples removed by a least squares technique and FIG. 7(c) showing reverse time demigration predicted multiples removed by a LS matching filtering ACDS embodiment. It should be noted in the field data example that the first order water bottom multiple is completely removed by the LS matching filtering ACDS embodiment, FIG. 7(c) but not by a simple least-squares technique, FIG. 7(b). It should further be noted that with the LS matching filtering ACDS embodiment, FIG. 7(c), the migration swings are significantly attenuated at the top of the salt body 702 and that in least squares technique, FIG. 7(b), the upper boundary of the salt body 704 appears distorted as compared to the upper boundary of the salt body 702 in the LS matching filtering ACDS embodiment. Further in the embodiment, the superiority of the preservation of primary events by LS matching filtering ACDS is observable in the anormaly and the parallel sedimentary layers, as indicated at the arrowed locations.

Figure 8:
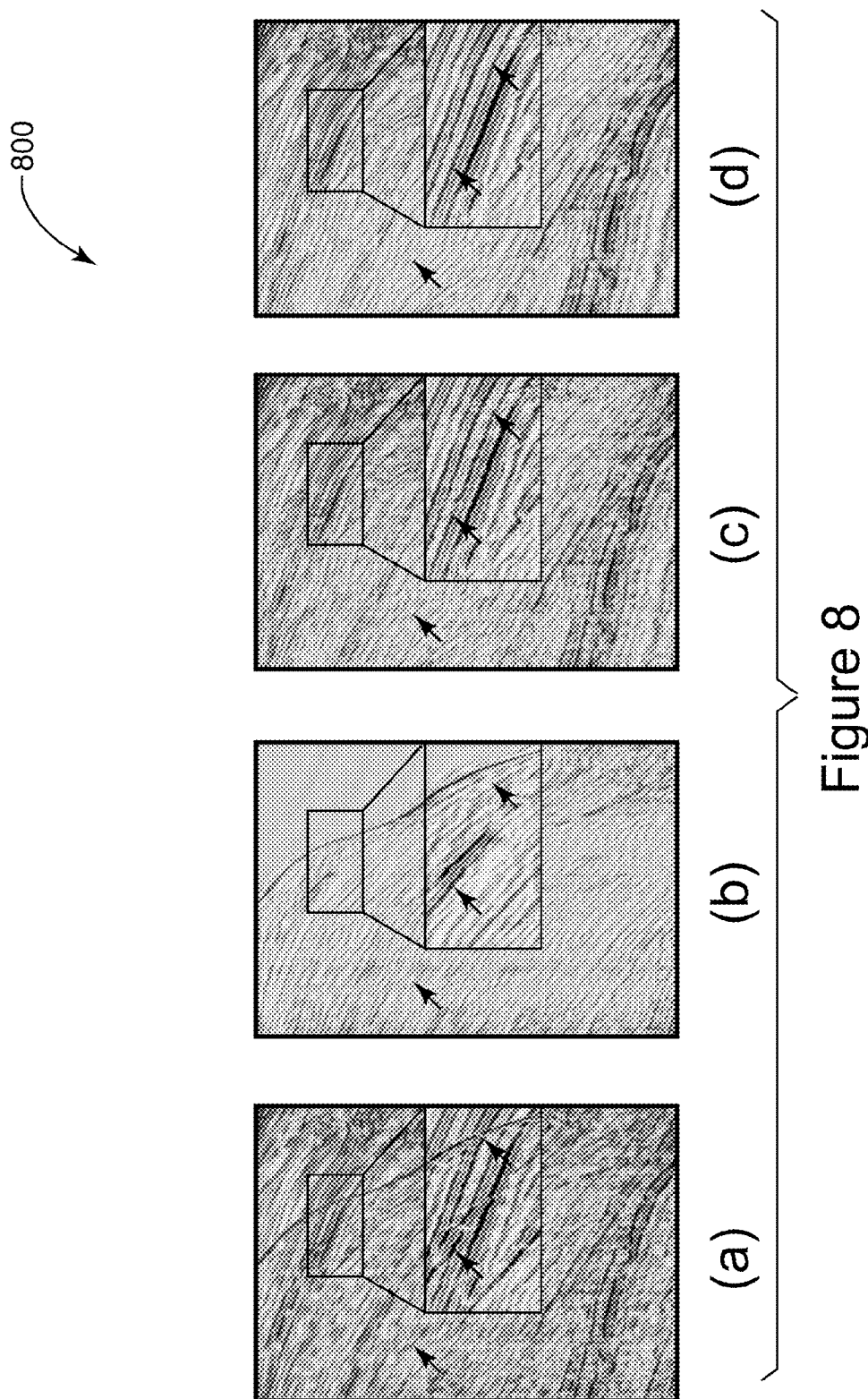

Continuing the embodiments by looking to FIG. 8, field data of a two-dimensional (2D) line is depicted wherein FIG. 8(a) is the multiple contaminated data, FIG. 8(b) is the Shallow Water Demultiple model of the data, FIG. 8(c) is a least squares technique modeled data and FIG. 8(d) is a Frequency-regularized ACDS (FrACDS) embodiment modeled data. The field data presents the application of a SWD approach to obtain the surface-related shallow water multiple model. Based on the observed moderate noise level of the seismic data, FIG. 8(a), a FrACDS embodiment was applied for primary-multiple separation and the results are depicted in FIG. 8(d) as compared to a least-squares separation as depicted in FIG. 8(c). It is clear from a comparison of FIG. 8(c) and FIG. 8(d) that the FrACDS embodiment better preserves the major primary events where residual shallow multiples penetrate. Further, the attenuation of the widespread noise that snaps and smears the image is better removed by the FrACDS embodiment. In general, the FrACDS embodiment tolerates the noise level and subtracts the multiple related curvelet coefficients in the noise-intensive frequency bands. Accordingly, the separation result obtained by the FrACDS embodiment presents a clearer image of lower noise level and more weakened residual multiples than possible with a least-squares separation.

Figure 9:
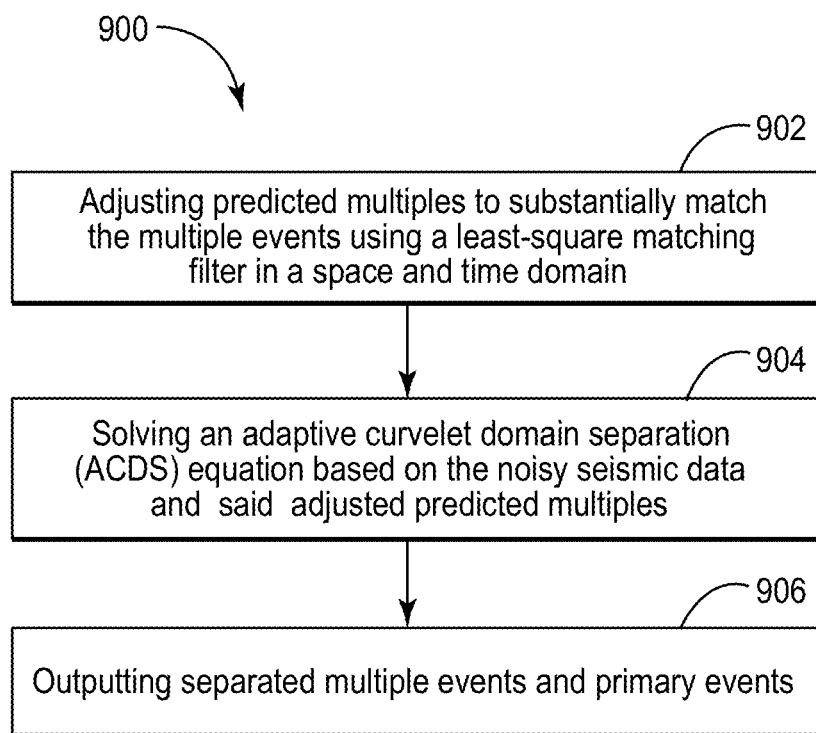
FIG. 9 depicts a flowchart of a method embodiment.

Looking now to FIG. 9, a method embodiment for separating multiple events from primary events in noisy seismic data 900 is depicted. This embodiment operates on predicted multiples which can, for example, be generated using any desired multiples model and the acquired noisy seismic data. It should be noted in the embodiment that the multiples being operated upon can be predicted by any available technique, e.g., Surface Related Multiple Elimination (SRME).

At step 902 of the method embodiment, the predicted multiples are fine tuned to more closely align them with the multiples in the seismic data. It should be noted in the method embodiment that a least-square matching filtering technique performed in the space and time domain is used for the fine tuning procedure. It should further be noted in the method embodiment that parameters comprising amplitude, travel time and spectrum are adjusted to steer the multiples model closer to the multiples presented in the seismic data Continuing at step 904 of the method embodiment, an Adaptive Curvelet Domain Separation (ACDS) equation is applied to the seismic data and solved based on the adjusted predicted multiples. It should be noted in the exemplary embodiment that a soft-thresholding optimization is incorporated in solving the ACDS equation. Next at step 908 of the method embodiment, the separated multiple events and primary events are output for further processing.

Figure 10:
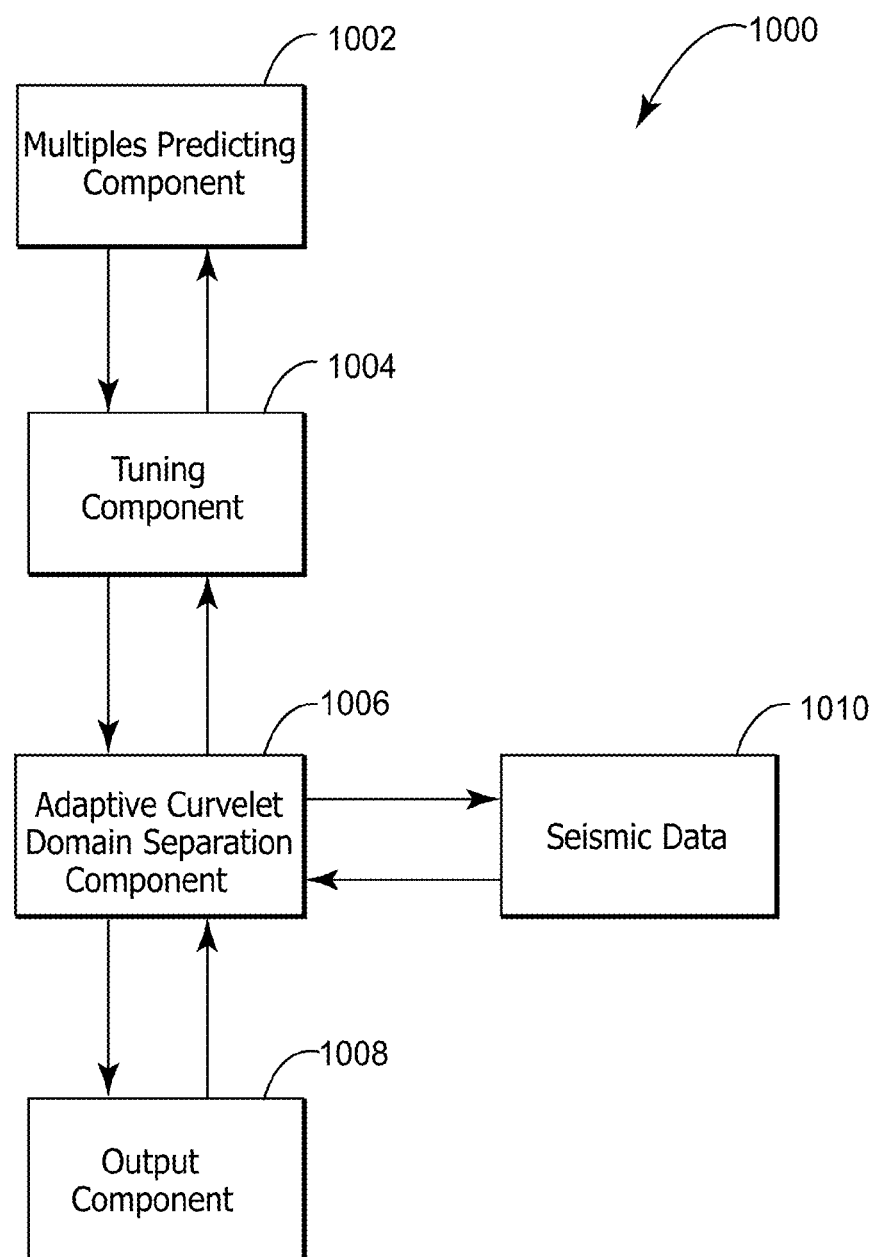
FIGS. 10-12 depict various aspects of software components or modules which can be used to implement the embodiments.

As will be appreciated from the foregoing discussion, methods for separation of multiples and primaries in seismic data according to these embodiments may, at least in part, be implemented in software operating on a suitably programmed computing device or system. An exemplary implementation, with suitable software modules or components, will now be described with respect to FIGS. 10-12. Looking now to FIG. 10, an embodiment separation system 1000 for separating multiples and primaries comprises a multiples predicting component 1002, a tuning component 1004, an adaptive curvelet domain separation component (ACDS) 1006, an output component 1008 and seismic data 1010. The multiples predicting component 1002 provides the capability to predict multiples associated with the seismic data 1010. It should be noted in the exemplary embodiment that the selected multiples predicting model should provide the most accurate predictions based on the multiples in the seismic data 1010.

Continuing with the embodiment, the tuning component 1004 provides the capability to adjust the predicted multiples such that the predicted multiples more closely match the multiples in the seismic data 1010. It should be noted in the embodiment that the predicted multiples will be adjusted using a least-square matching filtering technique. It should further be noted in the embodiment that characteristics comprising amplitude, travel time and spectrum will be adjusted to bring the predicted multiples closer to the multiples of the seismic data 1010.

Next in the embodiment, the ACDS component 1006 provides the capability to solve an ACDS equation based on the adjusted predicted multiples and the seismic data 1010. It should be noted in the exemplary embodiment that the ACDS equation incorporates a soft-thresholding optimization for obtaining the best solution. Continuing with the embodiment, the output component 1008 provides the capability to output separated multiple events and primary events from the seismic data 1010. It should be noted in the exemplary embodiment that the multiple events and primary events from the seismic data 1010 can be further processed.

Figure 11:
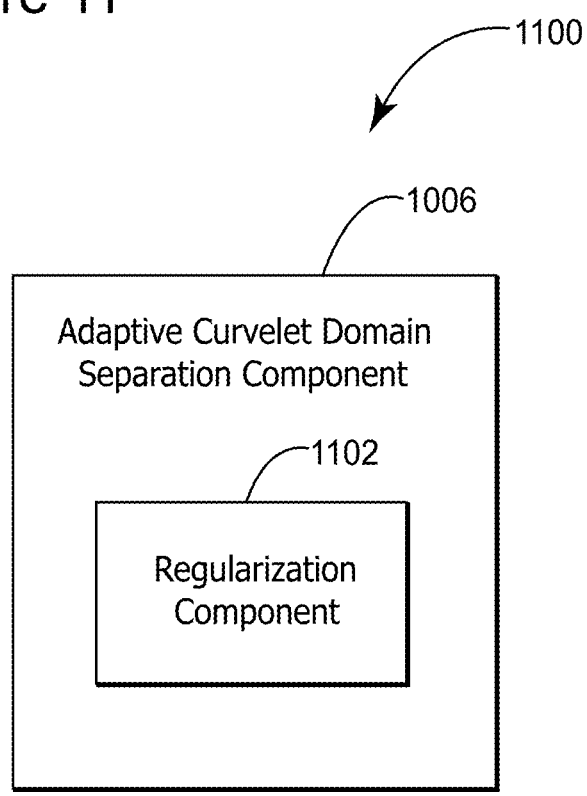

Looking now to FIG. 11, an Adaptive Curvelet Domain Separation component 1006 of an embodiment separation system 1100 further comprises a regularization component 1102. The regularization component 1102 provides the capability to divide the seismic data into a set of frequency bands and perform the separation of the multiple events from the primary events on each of the frequency bands.

Figure 12:
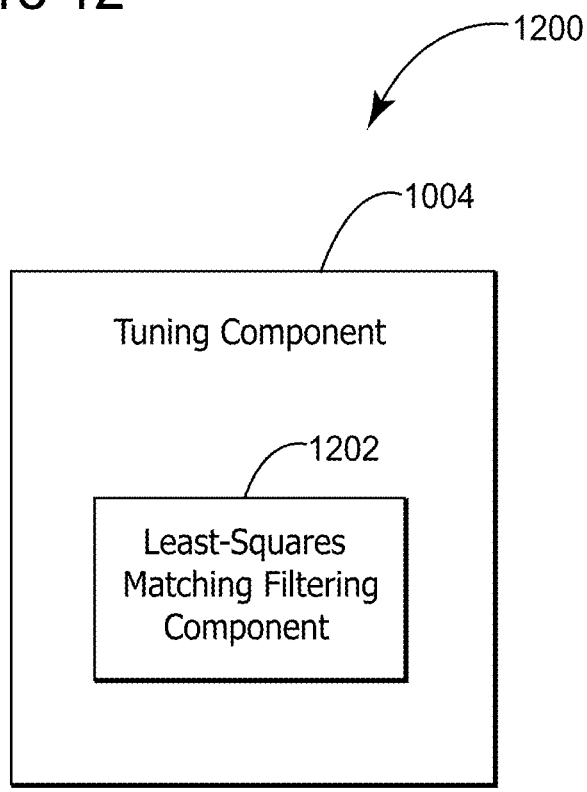

Looking now to FIG. 12, a tuning component 1004 further comprises a least-squares matching filtering component 1202. The least-squares matching filtering component 1202 provides the capability to tune the predicted multiples so that they more closely match the multiples associated with the seismic data 1010. It should be noted in the embodiment that the factors for tuning the predicted multiples comprise the amplitude, the travel time and the spectrum of the multiples.

Figure 13:
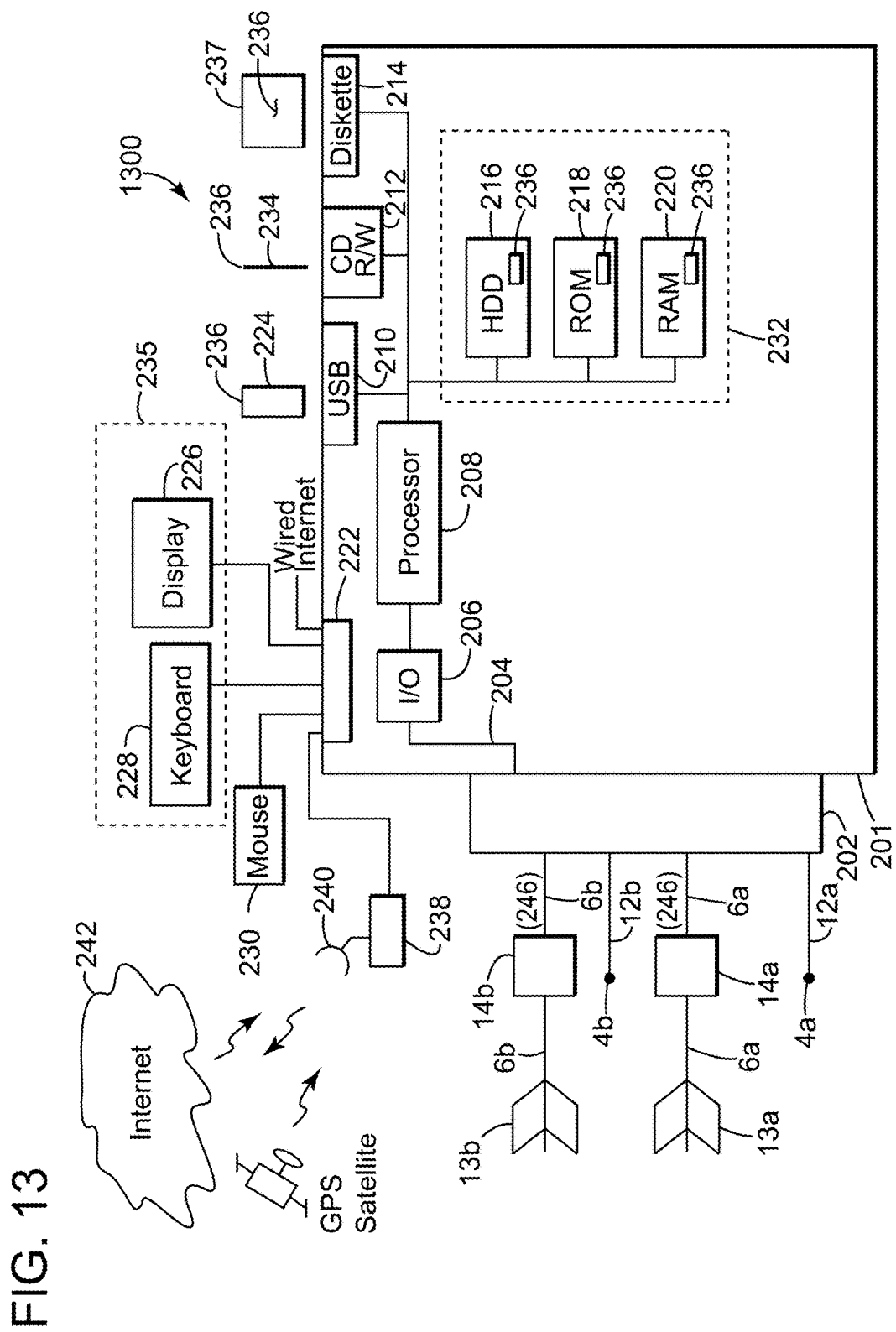
FIG. 13 depicts an exemplary data processing device or system which can be used to implement the embodiments.

The computing device(s) or other systems involved in separating primary events from multiple events as set forth in the above described embodiments may be any type of computing device capable of processing and communicating seismic data associated with a seismic survey. An example of a representative computing system capable of carrying out operations in accordance with these embodiments is illustrated in FIG. 13. System 1300 includes, among other items, server 201, source/receiver interface 1202, internal data/communications bus (bus) 204, processor(s) 208 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 210, compact disk (CD)/digital video disk (DVD) read/write (R/W) drive 212, floppy diskette drive 214 (though less used currently, many servers still include this device), and data storage unit 232.

Data storage unit 232 itself can comprise hard disk drive (HDD) 216 (these can include conventional magnetic storage media, but, as is becoming increasingly more prevalent, can include flash drive-type mass storage devices 224, among other types), ROM device(s) 218 (these can include electrically erasable (EE) programmable ROM (EEPROM) devices, ultra-violet erasable PROM devices (UVPROMs), among other types), and random access memory (RAM) devices 220. Usable with USB port 210 is flash drive device 224, and usable with CD/DVD R/W device 212 are CD/DVD disks 234 (which can be both read and write-able). Usable with diskette drive device 214 are floppy diskettes 237. Each of the memory storage devices, or the memory storage media (216, 218, 220, 224, 234, and 237, among other types), can contain parts or components, or in its entirety, executable software programming code (software) 236 that can implement part or all of the portions of the method described herein. Further, processor 208 itself can contain one or different types of memory storage devices (most probably, but not in a limiting manner, RAM memory storage media 220) that can store all or some of the components of software 236.

In addition to the above described components, system 200 also comprises user console 234, which can include keyboard 228, display 226, and mouse 230. All of these components are known to those of ordinary skill in the art, and this description includes all known and future variants of these types of devices. Display 226 can be any type of known display or presentation screen, such as liquid crystal displays (LCDs), light emitting diode displays (LEDs), plasma displays, cathode ray tubes (CRTs), among others. User console 235 can include one or more user interface mechanisms such as a mouse, keyboard, microphone, touch pad, touch screen, voice-recognition system, among other inter-active inter-communicative devices.

User console 234, and its components if separately provided, interface with server 201 via server input/output (I/O) interface 222, which can be an RS232, Ethernet, USB or other type of communications port, or can include all or some of these, and further includes any other type of communications means, presently known or further developed. System 200 can further include communications satellite/global positioning system (GPS) transceiver device 238, to which is electrically connected at least one antenna 240 (according to an exemplary embodiment, there would be at least one GPS receive-only antenna, and at least one separate satellite bi-directional communications antenna). System 200 can access internet 242, either through a hard wired connection, via I/O interface 222 directly, or wirelessly via antenna 240, and transceiver 238.

Server 201 can be coupled to other computing devices, such as those that operate or control the equipment of ship 2, via one or more networks. Server 201 may be part of a larger network configuration as in a global area network (GAN) (e.g., internet 242), which ultimately allows connection to various landlines.

According to a further exemplary embodiment, system 200, being designed for use in seismic exploration, will interface with one or more sources 4*a,b* and one or more receivers 14. These, as previously described, are attached to streamers 6*a,b*, to which are also attached birds 13*a,b* that are useful to maintain positioning. As further previously discussed, sources 4 and receivers 14 can communicate with server 201 either through an electrical cable that is part of streamer 6, or via a wireless system that can communicate via antenna 240 and transceiver 238 (collectively described as communications conduit 246).

According to further exemplary embodiments, user console 235 provides a means for personnel to enter commands and configuration into system 200 (e.g., via a keyboard, buttons, switches, touch screen and/or joy stick). Display device 226 can be used to show: streamer 6 position; visual representations of acquired data; source 4 and receiver 14 status information; survey information; and other information important to the seismic data acquisition process. Source and receiver interface unit 202 can receive the hydrophone seismic data from receiver 14 though streamer communication conduit 248 (discussed above) that can be part of streamer 6, as well as streamer 6 position information from birds 13; the link is bi-directional so that commands can also be sent to birds 13 to maintain proper streamer positioning. Source and receiver interface unit 202 can also communicate bi-directionally with sources 4 through the streamer communication conduit 248 that can be part of streamer 6. Excitation signals, control signals, output signals and status information related to source 4 can be exchanged by streamer communication conduit 248 between system 200 and source 4.

Bus 204 allows a data pathway for items such as: the transfer and storage of data that originate from either the source sensors or streamer receivers; for processor 208 to access stored data contained in data storage unit memory 232; for processor 208 to send information for visual display to display 226; or for the user to send commands to system operating programs/software 236 that might reside in either the processor 208 or the source and receiver interface unit 202.

System 200 can be used to implement the methods described above associated with separating primary events from multiple events according to an exemplary embodiment. Hardware, firmware, software or a combination thereof may be used to perform the various steps and operations described herein. According to an exemplary embodiment, software 236 for carrying out the above discussed steps can be stored and distributed on multi-media storage devices such as devices 216, 218, 220, 224, 234, and/or 237 (described above) or other form of media capable of portably storing information (e.g., universal serial bus (USB) flash drive 426). These storage media may be inserted into, and read by, devices such as the CD-ROM drive 414, the disk drive 412, among other types of software storage devices.

It should be noted in the embodiments described herein that these techniques can be applied in either an "offline", e.g., at a land-based data processing center or an "online" manner, i.e., in near real time while onboard the seismic vessel. For example, shear noise suppression can occur as the seismic data is recorded onboard the seismic vessel. In this case, it is possible for shear noise suppressed data to be generated as a measure of the quality of the sampling run.

The disclosed exemplary embodiments provide a server node, and a method for separating primary events from multiple events associated with seismic data. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for separating multiple events from primary events in noisy seismic data, said method comprising:
  receiving the noisy seismic data that includes the primary events and the multiple events ($M_c$), the noisy seismic data being recorded with seismic receivers;
  estimating predicted multiples (M');
  adjusting the predicted multiples (M') to substantially match said multiple events ($M_c$) by (i) applying a least-square matching filter ($f_{LS}$), in a space and time domain, to the predicted multiples (M') and (ii) applying an inverse curvelet transform ($C^{-1}$) to the multiple events ($M_c$), wherein the predicted multiples (M') are in the space and time domain and the multiple events ($M_c$) are in a curvelet domain;
  solving with a processor an adaptive curvelet domain separation (ACDS) equation based on said noisy seismic data and said adjusted predicted multiples, wherein the ACDS equation includes (a) a norm of the primary events, (b) a norm of the multiple events, (c) a norm of a difference between (i) the least-square matching filter ($f_{LS}$) applied to the predicted multiples (M') and (ii) the inverse curvelet transform ($C^{-1}$) applied to the multiple events ($M_c$), and (d) a norm of a difference between (1) the noisy seismic data and (2) the inverse curvelet transform ($C^{-1}$) applied to the primary events and the multiple events;
  outputting separated said multiple events and said primary events; and
  generating an image based on said separated primary events,
  wherein the noisy seismic data corresponds to various layers of the earth and the generated image represents an improved image of the various layers of the earth.

2. The method of claim 1, further comprising frequency regularized ACDS (FrACDS) based on solving said ACDS equation independently for each frequency band.

3. The method of claim 2, wherein solving for each frequency band is described by the equation:

$$F(P_c, M_c) = \Sigma_j f_j(P_c, M_c),$$

wherein F is an objective function, $P_c$ is the primaries events in the curvelet domain, and $M_c$ is the multiple events in the curvelet domain.

4. The method of claim 3, wherein an accuracy of said predicted multiples and an amount of noise associated with said noisy seismic data varies with said each frequency band.

5. The method of claim 1, wherein said adjusting said predicted multiples comprises adjusting amplitude, travel time and spectrum of said predicted multiples.

6. The method of claim 1, wherein said solving said ACDS equation is based on an iterative soft-thresholding optimization.

7. The method of claim 1, wherein said least square matching filtering is the $f_{LS}$ term in the ACDS equation:

$$f(P_c, M_c) = ||P_c||_{1,w_1} + ||M_c||_{1,w_2} + ||C^{-1}M_c - f_{LS}*M'||_2^2 + \eta||C^{-1}(P_c + M_c) - D||_2^2,$$

wherein $P_c$ is the primaries events in the curvelet domain, $M_c$ is the multiple events in the curvelet domain, D is the noisy seismic data, $\eta$ is an overall noise control parameter, $w_1$ and $w_2$ are proportional to curvelet coefficients of an initial guess of the seismic data, subscripts 1, $w_1$ denote an element-wise weighted L1-norm and subscripts 2, $w_2$ denote the element-wise weighted L2- norm.

8. The method of claim 1, further comprising incorporating L1-norm regularization into said ACDS equation.

9. The method of claim 1, further comprising incorporating L2-norm regularization into said ACDS equation.

10. A seismic data processing system for separating multiple events from primary events in noisy seismic data, said system comprising:
 a memory device configured to store the noisy seismic data (D), wherein the noisy seismic data (D) includes the primary events and the multiple events ($M_c$), the noisy seismic data being recorded with seismic receivers;
 one or more processors configured to execute computer instructions and a memory configured to store said computer instructions wherein said computer instructions further comprise:
  a multiples predicting component for generating predicted multiples (M') associated with said noisy seismic data (D);
  a tuning component for adjusting said predicted multiples (M') to substantially match said multiple events ($M_c$) associated with said noisy seismic data (D) by (i) applying a least-square matching filter ($f_{LS}$), in a space and time domain, to the predicted multiples (M') and (ii) applying an inverse curvelet transform ($C^{-1}$) to the multiple events ($M_c$), wherein the predicted multiples (M') are in the space and time domain and the multiple events ($M_c$) are in a curvelet domain;
  an adaptive curvelet domain separation (ACDS) component for
 solving an ACDS equation based on said noisy seismic data and a plurality of adjusted predicted multiples, wherein the ACDS equation includes (a) a norm of the primary events, (b) a norm of the multiple events, (c) a norm of a difference between (i) the least-square matching filter ($f_{LS}$) applied to the predicted multiples (M') and (ii) the inverse curvelet transform ($C^{-1}$) applied to the multiple events ($M_c$), and (d) a norm of a difference between (1) the noisy seismic data and (2) the inverse curvelet transform ($C^{-1}$) applied to the primary events and the multiple events; and
  an output component for separately outputting said multiple events and said primary events, and
 a monitor configured to show an image generated based on said separated primary events,
 wherein the noisy seismic data corresponds to various layers of the earth and the generated image represents an improved image of the various layers of the earth.

11. The seismic data processing system of claim 10, wherein said ACDS component further comprises a regularization component for solving said ACDS component for each of a plurality of frequency bands associated with said noisy seismic data.

12. The seismic data processing system of claim 10, wherein said tuning component is configured to adjust amplitude, travel time and spectrum of said predicted multiples.

13. The seismic data processing system of claim 10, wherein said ACDS component solves said ACDS equation based on an iterative soft-thresholding optimization.

14. The seismic data processing system of claim 10, wherein said ACDS component is configured to incorporate L1-norm regularization into said ACDS equation.

15. The seismic data processing system of claim 10, wherein said ACDS component is configured to incorporate L2-norm regularization into said ACDS equation.

16. The seismic data processing system of claim 10, wherein said ACDS component is configured to divide said noisy seismic data into separately processed frequency bands.

17. The seismic data processing system of claim 16, wherein said noise associated with said separately processed frequency bands can vary in each of said separately processed frequency bands.

18. The seismic data processing system of claim 16, wherein accuracy of said predicted multiples can vary for each of said separately processed frequency bands.

19. A method for separating multiple events from primary events in noisy seismic data, said method comprising:
 receiving the noisy seismic data that includes the primary events and the multiple events, the noisy seismic data being recorded with seismic receivers;
 adjusting predicted multiples to substantially match said multiple events using a least-square matching filter in a space and time domain;
 solving with a processor an adaptive curvelet domain separation (ACDS) equation based on said noisy seismic data and said adjusted predicted multiples;
 outputting separated said multiple events and said primary events,
 wherein said least square matching filtering is the $f_{LS}$ term in the ACDS equation:

$$f(P_c, M_c) = ||P_c||_{1,w_1} + ||M_c||_{1,w_2} + ||C^{-1}M_c - f_{LS} * M'||_2^2 + \eta ||C^{-1}(P_c + M_c) - D||_2^2,$$

wherein $P_c$ is the primaries events in the curvelet domain, $M_c$ is the multiple events in the curvelet domain, D is the noisy seismic data, $C^{-1}$ is an inverse curvelet transform, M' is the predicted multiples, $\eta$ is an overall noise control parameter, $w_1$ and $w_2$ are proportional to curvelet coefficients of an initial guess of the seismic data, subscripts 1, $w_1$ denote an element-wise weighted L1-norm and subscripts 2, $w_2$ denote the element-wise weighted L2-norm, and
 generating an image based on said separated primary events,
 wherein the noisy seismic data corresponds to various layers of the earth and the generated image represents an improved image of the various layers of the earth.

* * * * *